United States Patent [19]

Ray

[11] Patent Number: 5,754,311
[45] Date of Patent: May 19, 1998

[54] METHOD AND APPARATUS FOR GENERATING SIMULTANEOUSLY DERIVED CORRELATED DIGITAL HALFTONE PATTERNS

[75] Inventor: Lawrence A. Ray, Rochester, N.Y.

[73] Assignee: Eastman Kodak Company, Rochester, N.Y.

[21] Appl. No.: 848,779

[22] Filed: Mar. 10, 1992

[51] Int. Cl.$^6$ ................................................. H04N 1/40
[52] U.S. Cl. ........................ 358/456; 358/457; 358/458
[58] Field of Search ............................ 358/456, 75, 283, 358/983, 104, 133, 135, 138, 242, 260, 280, 298, 457, 455, 460, 462, 450, 451, 453, 448, 125, 166

[56] References Cited

U.S. PATENT DOCUMENTS

| | | | |
|---|---|---|---|
| 3,775,559 | 11/1973 | Vieri . | |
| 4,339,774 | 7/1982 | Temple | 358/283 |
| 4,343,037 | 8/1982 | Bolton | 358/104 X |
| 4,514,818 | 4/1985 | Walker | 340/703 X |
| 4,780,761 | 10/1988 | Daly et al. | 358/133 |
| 4,805,030 | 2/1989 | Tanaka | 358/260 |
| 4,910,603 | 3/1990 | Hirahara et al. | 358/298 |
| 4,920,501 | 4/1990 | Sullivan et al. | 358/463 |
| 5,177,795 | 1/1993 | Tanioka et al. | 358/460 |
| 5,200,840 | 4/1993 | Koike et al. | 358/451 |
| 5,214,517 | 5/1993 | Sullivan et al. | 358/456 |

OTHER PUBLICATIONS

J. Sullivan, L. Ray, R. Miller, "Design of Minimum Visual Modulation Halftone Patterns", pp. 33–38; IEEE Transactions On Systems, Man, And Cybernetics, vol. 21, No. 1, Jan./Feb. 1991.

S. Daly, "Application of a Noise Adaptive Contrast Sensitivity Function to Image Data Compression", pp. 217–227, SPIE vol. 1077 Human Vision, Visual Processing, and Digital Display(1989).

T. Mitsa, K.J. Parker, "Digital halftoning using a blue noise mask", pp. 47–56, SPIE vol. 1452 Image Processing Algorithms and Techniques II (1991).

R. Ulichney, "Digital Halftoning", pp. 77–79 and 238–240, The MIT Press.

I. Chen, "Stochastic Modelof Halftone Images in Digital Electrography", pp. 44–48, Journal of Imaging Science, vol. 35, No. 1, Jan./Feb. 1991.

B.E. Bayer, "An Optimum Method for Two–Level Rendition Of Continuous–Tone Pictures", Proc. of IEEE Intn. Conf. Comm. (1973).

D.E. Goldberg, "Genetic Algorithms in Search, Optimization, and Machine Learning", pp. 1–23, Addison–Wesley Publishing Company, Inc.

*Primary Examiner*—Paul Ip
*Attorney, Agent, or Firm*—Thomas H. Close

[57] ABSTRACT

Method and apparatus for generating a halftone image. An ensemble of correlated minimum visual modulation two-dimensional binary patterns are provided. Each pattern corresponds to one density level of a digital input signal. The set of patterns is generated simultaneously to minimize an ensemble cost function which is the variance of non-zero spatial frequencies weighted by a human visual system modulation transfer function. The patterns are then modularly addressed to select bits to form halftone pattern.

18 Claims, 1 Drawing Sheet

METHOD AND APPARATUS FOR GENERATING SIMULTANEOUSLY DERIVED CORRELATED DIGITAL HALFTONE PATTERNS

TECHNICAL FIELD

The present invention relates to the field of digital image processing and more particularly to a method for digital halftoning continuous tone images using a correlated database of modulated bit-map patterns that are globally optimized for minimum visual modulation.

BACKGROUND ART

Digital halftoning refers to the technique for simulating a continuous tone image by means of patterns of dots and no dots which he eye perceives as a representation of a gray-scale level. Halftoning might be used, for example, to represent a continuous tone photograph with a printing device such as a laser printer capable only of printing dots or leaving open spaces. As one might imagine, there are virtually limitless numbers of patterns of dots and no dots which may represent an average desired density or gray scale level. However, such patterns can produce images with visual noise such as moire patterns which seriously degrade image quality. The goal of the present invention, therefore, is to minimize the visually perceived modulation noise for patterns of dots and no dots that on average represent a particular signal gray level.

Digital halftoning for generating continuous-tone images has been practical since the mid-1960's (see "Picture Generation with a Standard Line Printer," by Perry and Mendelsohn, Comm. of the ACM, Vol. 7, No. 5, pp 311-313.) The two major techniques in current use are dithering and error diffusion. See *Digital Halftoning* by Ulichney, MIT Press, Cambridge, Mass., pp 77-79, 127, 239-240. The most notable dithering techniques are random dither, clustered-dot dither, dispersed dot dither, and dither pattern look-up-tables. Random dither was developed first but is rarely used as it produces images with the poor image quality.

Clustered-dot dither and dispersed-dot dither are used with clustered-dot dither being by far the most prevalent. These techniques are based upon a threshold screen pattern that is generally a fixed size, e.g., 8×8 image pixels, which is compared with the input digital image values. If the input value is greater than the screen pattern number, the output is set to "on" else the output is set to "off." The threshold map generally is devised in a sequential manner, with output patterns being decided conditioned on decisions made on previous halftone density levels. In the case of the clustered-dot technique, the patterns are developed from a center growing dot, similar to the manner that halftones are created in graphic arts applications such a lithography in which dot size can vary.

Larger patterns allow more levels, but also introduce a reduction in the effective resolution because the transition between levels is at a coarser pitch. At the medium pixel rate of copiers and laser printers, e.g., 300–500 dots per inch, pattern artifacts are visible for screen patterns larger than 4×4. The resulting number of effective levels, e.g., 16, is inadequate for typical continuous-tone imagery.

Dither pattern look-up-tables attempt to circumvent the problem of reduced resolution typical of threshold methods while maintaining the implementation simplicity over methods such as error diffusion. These patterns are used as a data base in this technique that are accessed in a modular fashion. Each halftone pattern in the data base in this technique has been determined independently to have minimum visual distortion for a selected gray-scale, (see "Design of Minimum Visual Modulation Halftone Patterns," by J. Sullivan, L. Ray and R. Miller, IEEE Transactions on Systems, Man and Cybernetics, Vol. 21, No. 1, 1991, pp. 33–38.) While these patterns are excellent for tint-fill applications, when applied to general imaging applications the results are disappointing.

Error diffusion fundamentally is different from dither pattern halftoning approaches in that there is no fixed pattern. Instead a recursive algorithm is used that attempts causally to correct errors made by representing the continuous input signal by binary values. The two major components of error diffusion are a matrix of fractions that weight past errors and a threshold operator based on the sum of those weighted errors and the current pixel that determines whether to output an "on" or "off." The best error diffusion techniques are two-dimensional, meaning that the error is fed back from previous lines as well as previous pixels. The error feed-back mechanism is usually linear and the sum error is a linear combination of past errors, but the thresholding is nonlinear thereby making the compound process nonlinear. Approximating thresholding as a signal-dependent gain, it can be shown that for positive error weights the output binary signal will be high-pass in uniform image regions introducing "blue-noise" into the image (see Ulichney, cited above). As discussed by Ulichney, this "blue-noise" is a very favorable feature because the perception of this noise will be reduced by the low-pass filtering of the human visual system causing a higher perceived signal-to-noise ratio. Unfortunately, the error weights are indirectly related to this preferred noise characteristic and therefore provide suboptimal control, and for certain signal levels the causal feedback can become visually unstable generating correlated patterns or "worms" that are visually objectionable. The most common solution is modulating the weights randomly which reduces the "worms" but also increases the noise.

Individual halftone patterns should be correlated in order to produce images of acceptable quality. Approaches which do not correlate the patterns result in severe image noise, nearly comparable to the results obtained using a random-dot dither pattern. A common approach is to determine a nested set of patterns. (see "Optimal Method for Two-Level Rendition of Continuous-Tone Pictures," by B. E. Bayer, Proc. IEEE Int. Comm. Conference Record, pp. (26-11)-(26-15)) The approach described in this specification guarantees that the patterns will be nested for successive gray-scale levels and that the correlation between patterns is maintained.

Other halftoning approaches have used visual models to design halftone patterns. These patterns typically are referred to as "blue-noise" patterns. As discussed above, "blue-noise" is a desirable feature. In the prior art, however, the selection of the patterns is done sequentially, either by a lattice or a sequential decision process (see "Digital Halftoning with Correlated Minimum Visual Modulation Pattern," U.S. patent application, Ser. No. 476,090 filed Feb. 7, 1990 by Lawrence A. Ray and James R. Sullivan, issued as U.S. Pat. No. 5,214,517 and "Digital Halftoning Using a Blue Noise Mask," by Theophano Mitsa and Kevin J. Parker, in Image Processing Algorithms and Techniques II, SPIE Vol. 1452, 1991, pp. 47–56.) These methods are limited because of the dependence upon a sequential decision process. Such a sequential decision process attempts to optimize the results at each stage which may result in suboptimal results in subsequent pattern selection. In the present invention this limitation is eliminated by developing all patterns simultaneously. Correlated patterns result which are optimal as an ensemble.

SUMMARY OF THE INVENTION

The method according to the invention for generating a halftone image includes providing an ensemble of correlated minimum visual modulation two-dimensional binary patterns, each pattern corresponding to one density level of a digital input signal. The set of patterns is generated simultaneously to minimize an ensemble cost function which is the sum of costs which are the variances of non-zero spatial frequencies weighted by a human visual system modulation transfer function. The patterns are then modularly addressed to select bits to form the halftone image. "Modularly addressing" means using the least significant bits of a digital image address to address the binary halftone patterns. In one embodiment, the set of patterns is generated by stochastic annealing, a combinatorial minimization technique. In another embodiment the minimization technique is a genetic algorithm.

The halftone pattern is determined by a two-dimensional pixel array the elements of which are integers representing the density levels of pixels of the input signal selected so that the halftone pattern has the correct mean density. It is preferred that the two-dimensional array be N×N, preferably 32×32. A suitable ensemble cost function is the sum of costs for individual bit patterns derived from the modulus of the discrete Fourier transform multiplied by the visual modulation transfer function. The N×N pixel (e.g., 32×32) array explicitly determines bit-map patterns for each density level in an image. The patterns are correlated and collectively have minimum visual noise within constraints imposed by the correlation and the modular addressing of the patterns with each pixel value and pixel location in the image. At each gray level the array uniquely determines a halftone pattern with the correct mean density.

A key to the present invention is that the patterns are developed simultaneously as compared with a sequential process known in the prior art. The techniques of the invention can be implemented with minimal sophistication to generate optimal image quality. This quality is achieved by optimizing globally as compared to systems which are either optimized locally or the optimization is conditioned on prior decisions or optimizations. The prior art techniques result in patterns that, although correlated, begin to display undesirable spatial frequencies at levels highly conditioned on previous results. These spatial frequencies can not be removed because of the prior pattern selections. According to the invention, by optimizing the ensemble globally, a balance across the patterns can be set and a particular pattern is not disadvantaged because of irrelevant numerical characteristics, e.g., being an odd number.

The cost function used in this invention spreads the noise associated with a halftone pattern in a way that appears as a completely random structure and is visually appealing. Thus, the present invention eliminates the isolated spatial frequencies that are observable to an observer in prior art techniques.

DESCRIPTION OF THE PREFERRED EMBODIMENT

In the following it is assumed that patterns for 256 gray scale levels are designed using a 32×32 array M. It is emphasized that the method of this invention is general and can apply to any number of levels and array size. For 256 gray scale levels, the elements of the array M are integer values between 0 and 255. At each gray level the array M uniquely determines a halftone pattern with the correct mean density. For a gray scale level q, the halftone pattern $P_q$ is determined by $$P_q(i,j) = \begin{cases} 1 & \text{if } q \leq M(i,j) \\ 0 & \text{if } q > M(i,j) \end{cases} \quad (1)$$

Individual halftone patterns need to be correlated in order to produce images of acceptable quality. As discussed above, approaches which do not correlate the patterns result in severe image noise, nearly comparable to the results obtained by using a random-dot dither pattern. The approach described by equation (1) above guarantees that the patterns will be nested for successive gray-scale levels, and that the correlation between patterns is maintained.

The method for generating halftone images according to the present invention involves designing correlated minimum visual modulation patterns simultaneously for all input pixel levels, and modularly addressing the patterns to select bits to be used in the halftone image. The bit-map pattern design will be described first followed by description of the addressing and pattern selection process.

The goal of the present invention is to minimize the visually perceived modulation for a pattern of dots and no dots that on average represent a particular signal level. Moreover, the patterns must be correlated sufficiently in order to reduce any artifacts that occur because of shifts in the input signal or textual differences between patterns. The first aspect of the pattern generation criteria requires the definition of visual modulation or cost for a given pattern and a method for cost minimization. The second aspect of the pattern generation is to correlate the patterns and determine an ensemble cost which is used to design the ensemble simultaneously.

Figure 1:
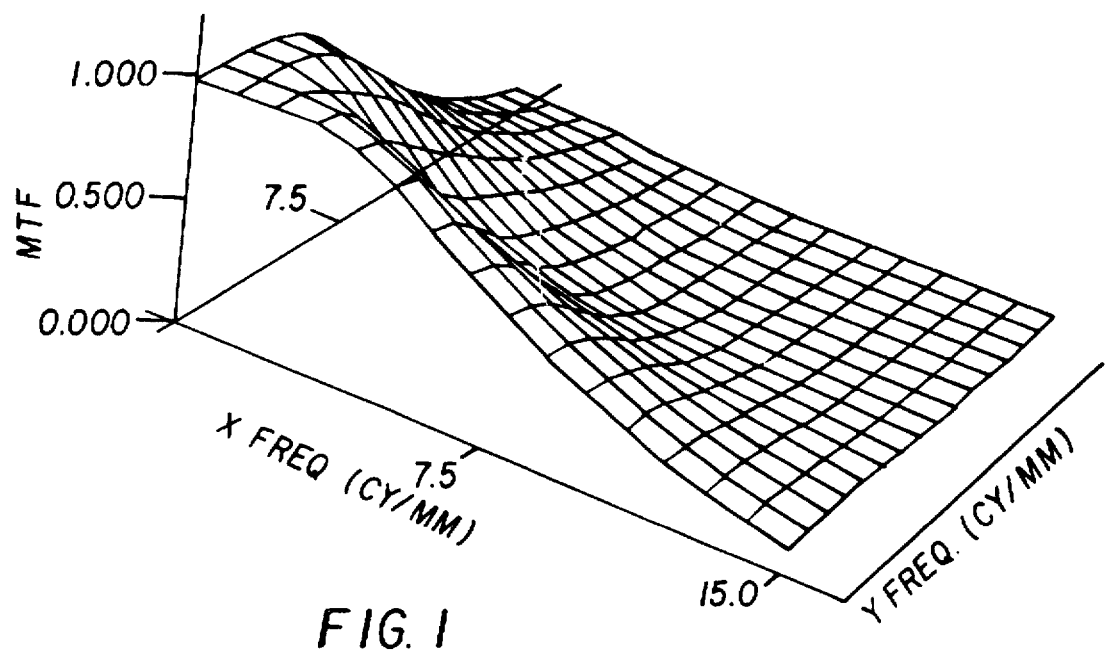
FIG. 1 is a graph of a human visual modulation transfer function.

For normal viewing distance, i.e., 10 inches, the effective two-dimensional modulation transfer function, MTF, of the human visual system is shown in FIG. 1. This transfer function requires a definition of visual modulation which was established to first-order in a functional model of the low-contrast photopic MTF of the human visual system (see "Application of a noise adaptive contrast sensitivity function to image data compression," by S. Daly, SPIE Proc., Vol. 1077, 1989, pp. 217–227). The MTF function is given by $$\tilde{V}_{ij} = \begin{cases} a(b + c\tilde{f}_{ij})\exp(-(c\tilde{f}_{ij})^d) & \text{if } \tilde{f}_{ij} > f_{max} \\ 1.0 & \text{otherwise} \end{cases} \quad (2)$$

where the constants a, b, c and d are calculated from empirical data to be 2.2, 0.192, 0.114 and 1.1 respectively. $\tilde{f}_{ij}$ is the radial spatial frequency in cycles/degree of visual subtense scaled for the viewing distance, and fmax is the frequency at which the functional MTF function peaks. To implement this function it is necessary to convert discrete horizontal and vertical document frequencies, $\{f_i, f_j\}$, into radial visual frequencies.

For a symmetric printing grid, the horizontal and vertical discrete frequencies are periodic and given in terms of the dot pitch Δ and the number of frequencies N by $$f_i = \frac{i-1}{\Delta N} \quad (3)$$

$$f_j = \frac{j-1}{\Delta N}$$

Converting these to radial frequencies, and scaling the result to cycles/visual degree for a viewing distance, dis, in millimeters gives:

$$f_{ij} = \frac{\pi}{180 \arcsin\left(\frac{1}{\sqrt{1+dis^2}}\right)} \sqrt{f_i^2 + f_j^2} \quad (4)$$

To account for variation in visual MTF as a function of viewing angle, θ, it is convenient to normalize these frequencies by an angular dependent function, $S_{ij}(\theta)$, and use equation (4). This is $$\tilde{f}_{ij} = \frac{f_{ij}}{S_{ij}(\theta)} \quad (5)$$

where the angular normalization function $S_{ij}(\theta)$ is given by Daly as, $$S_{ij}(\theta) = \frac{1-w}{2} \cos(4\theta) + \frac{1+w}{2} \quad (6)$$

with w being a symmetry parameter, and $$\theta = \arctan\left(\frac{f_j}{f_i}\right) \quad (7)$$

Review of equation (6) shows that as w decreases, $S_{ij}(\theta)$ decreases near 45° which in turn increase $\tilde{f}$, and decreases $V_{ij}$, making the visual MTF more low-pass at those angles. The visual MTF for Δ=0.0625 (i.e., 400 dots/inch), N=32, and w=0.7 at normal viewing distance is shown in FIG. 1, illustrating the low-pass nature of the visual system and the reduced sensitivity at 45°.

There are many cost functions that can be forwarded, and the approach disclosed herein is not limited to a particular cost function.

One obvious cost function is given by:

$$Cost = \sum_{i=0}^{N-1} \sum_{j=0}^{N-1} \tilde{V}_{ij} R_{ij}^2 \quad (8)$$

where $R_{ij}^2$ is the squared magnitude of the Fourier transform of the halftone pattern. If the human visual system truly was linear then the MTF of equation (2) would be sufficient to characterize fully the perception of halftoning noise. However, since the human visual system is not linear and is very sensitive to periodic noise and replicated patterns a cost function more sophisticated than represented by equation (8) is desirable. The cost function represented by equation (8) has a preference for discrete frequencies. An improved cost function detailed below attempts to spread the pattern signal in a smooth manner within the spatial frequency domain but in a manner consistent with the model of the human visual system. The effect of this is to reduce the preference to a discrete frequency. This preferred cost function is the variance of the non-zero spatial frequencies which have been weighted by the human visual system model. The goal is to minimize the variance, which can be considered as a weighted or visual white noise. Experimentally, this cost function produces patterns which have a more acceptable visual appearance.

To evaluate the cost for a particular N×N bit pattern, $P_q$, derived from the pattern M(i,j), the modulus of the discrete Fourier Transform (DFT) of the pattern $P_q$ is calculated and multiplied by the visual MTF, and is denoted R(i,j). The cost is the variance of the entries of the array R less R(0,0). The value of R(0,0) is the mean level and is constant for any configuration of the pattern $P_q$. Lower costs are indicative of pattern noise which is visually white with no visual spatial frequency predominating. We denote this cost as $C_q$. The overall cost of the ensemble is given by a weighted sum of all $C_q$, for q=1, . . . ,254. Symbolically, $$Cost(m) = \sum_{q=1}^{254} W_q C_q \quad (9)$$

where $W_q$, q=1, 254 is a set of weights, with the present embodiment having all $W_q$ being equal. The choice of weights, $W_q$, is a design parameter. If mid-gray-scale levels have more importance, then the relative weights are increased.

The effective gray-scale of diffuse-dot patterns has been shown to vary from being linear as one might naively expect. See, I. Chen, "Stochastic Model of Halftone Images in Digital Electrography," Journal of Imaging Science, Vol. 35, No. 1, January/February 1991, pp. 44–48. However, the nonlinearity can easily be remedied by modifying the threshold map by selecting the table entries to be unique and applying the stochastic annealing process to determine the best correlated patterns. By applying the model from the Chen reference, the perceived gray-scale can be estimated and 256 values of the 1024 can be selected to maintain the linear response.

Since a large number of pattern ensembles can be determined, the selection of an optimal ensemble becomes a significant combinatorial problem. One method to optimize the ensemble is a genetic algorithm (see "Genetic Algorithms in Search Optimization and Machine Learning," by David E. Goldberg, Addison-Wesley, Reading, Mass. 1989 pages 1–22). Another method to optimize the ensemble is to apply a method known as stochastic annealing or simulated annealing (see "Design of Minimum Visual Modulation Halftone Patterns," by J. Sullivan, L. Ray and R. Miller, IEEE Trans. on Systems, Man and Cybernetics, Vol. 21, No. 1, January 1991, pp. 33–38). A key feature of this method is that it is well suited for a discrete search space and that local minima can be escaped by the possibility of accepting cost increases at each iteration.

Stochastic annealing is implemented by selecting a current configuration and calculating its visual cost. Two entries in the array M are selected randomly, say $(i,j)_0$ and $(i,j)_1$ if $M((i,j)_0) \neq M((i,j)_1)$ then the two entries are exchanged. Say $M((i,j)_0) = q_0$ and $M((i,j)_1) = q_1$, then all patterns $P_q$ for $q_0 \leq q \leq q_1$ are perturbed and new visual costs must be computed in order to establish the cost of the new M array.

In the following it assumed that the pattern size is 32×32, but with obvious modifications these patterns can be expanded to other array sizes.

Details of the stochastic annealing are included in the following steps:

1. Initialize an array M with entries randomly selected such that pattern $P_q$ has the correct average gray-scale value. In the case of 256 gray-scale levels using a 32×32 array M the initialized array M has entries randomly selected such that four values like 51, 102, 153 and 204 are selected precisely 5 times, and all other values between 1 and 254 are selected precisely four times.
2. Determine the visual cost of the array M as described above, denoted $C_0$.
3. Exchange two entries in M to form array $M^1$ and compute the cost $C_1$.

4. Compute the absolute difference of $C_0$ and $C_1$ and store the result in a table.

5. Perform steps 1–4 many times, e.g., 1000, sort the table in descending order and select a value representing the percentage of cost increases to be accepted initially, e.g., 80% for table entry 800.

6. Calculate a test statistic $\tau$ given by:

$$\tau = \exp(-\text{Table (800)})$$

This statistic commonly is known as the temperature of the system and will be used as the initial temperature.

7. Configure a new array M.

8. Calculate the visual cost of this array, and denote it by $C_{old}$.

9. Exchange two entries of the array M and compute the resulting visual cost $C_{new}$, and the change in visual cost, $\Delta\text{Cost} = C_{old} - C_{new}$.

10. If $\Delta\text{Cost} \leq 0.0$, then accept the change and $C_{old} = C_{new}$.

11. If $\Delta\text{Cost} > 0.0$, compute statistic $\rho = \exp(-\Delta\text{Cost}/\tau)$ and a random number $\xi$, $0 < \xi < 1$. If $\rho < \xi$, then accept the new configuration and $C_{old} = C_{new}$. Otherwise, the array M remains as it was.

12. Repeat steps 8–11 many times, e.g., 1000, and then decrease the temperature $\tau$ by some factor $\kappa$, where $\kappa < 1$, to form a new temperature $\kappa\tau$.

13. Repeat steps 8–12 many times, e.g., 100 or until the visual cost no longer diminishes.

Figure 2:
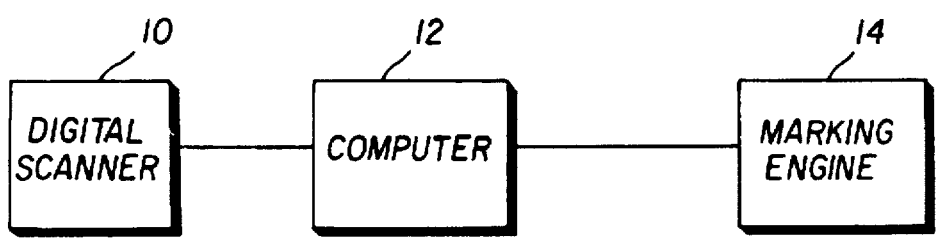
FIG. 2 is block diagram showing the digital halftone image processing technique of the invention.

FIG. 2 is a block diagram illustrating the technique of this invention. Digital scanner 10 scans an input image such as a continuous tone photograph and for each pixel generates a binary representation of the gray-scale level of the pixel. The output from the digital scanner 10 is processed by a general purpose computer 12 which may be a supercomputer. The computer 12 develops the individual halftone patterns by the procedure set forth above to create a pattern for each gray-scale level. In the embodiments described above the computer 12 will generate 256 patterns which are stored in a memory within the computer 12. The patterns are then modularly addressed to select bits to form the halftone image. The pattern corresponding to the gray-scale level of a pixel is printed by a marking engine 14 which may be a printer such as a laser printer having a resolution of 300 to 500 dots per inch. The process is repeated for each pixel of the input material. In this way, a halftone image is created which minimizes visual noise.

What is claimed is:

1. Method for generating a halftone image with a computer comprising:

providing a set of correlated minimum visual modulation two-dimensional binary patterns, each pattern corresponding to one density level of a digital input signal, the set of patterns being generated simultaneously to minimize an ensemble cost function which is the variance of non-zero spatial frequencies weighted by a human visual system modulation transfer function; and modularly addressing the patterns to select bits to form the halftone pattern.

2. The method of claim 1 wherein the set of patterns is generated by a combinatorial minimization technique.

3. The method of claim 2 wherein the combinatorial minimization technique is stochastic annealing.

4. The method of claim 2 wherein the combinatorial minimization technique is a genetic algorithm.

5. The method of claim 1 wherein the set of binary patterns is determined by a two-dimensional array, the elements of which are integers representing the density levels of the input signal so each binary pattern in the set has the correct mean density.

6. The method of claim 5 wherein a halftone pattern $P_q$ for density level q is determined by $$P_q = \begin{cases} 1 \text{ if } q \leq M_{(i,j)} \\ 0 \text{ if } q > M_{(i,j)} \end{cases}$$

where $M_{(i,j)}$ is the two-dimensional array.

7. The method of claims 5 or 6 wherein the two-dimensional array is 32×32.

8. The method of claim 1 wherein the ensemble cost function is $$\text{Cost}(m) = \sum_{q=1}^{N} W_q C_q$$

where $C_q$ is the cost of a particular bit pattern $P_q$ derived from the modulus of the discrete fourier transform multiplied by the visual modulation transfer function and $W_q$ is a set of weights.

9. The method of claim 8 wherein the ensemble cost is optimized by a combinatorial minimization technique.

10. The method of claim 9 wherein the combinatorial minimization technique is stochastic annealing and is implemented by the steps of:

(1) initializing an array M with entries randomly selected such that the pattern $P_q$ has the correct average gray-scale value;

(2) determining the visual cost of the array M;

(3) exchanging two entries in M to form array $M^1$ and compute the cost $C_1$;

(4) computing the absolute difference of $C_0$ and $C_1$ and storing the result in a table;

(5) performing steps 1 to 4 many times, sorting the table in descending order and selecting a value representing the percentage of cost increases to be accepted initially;

(6) calculating a test statistic $\tau$;

(7) configuring a new array M;

(8) calculating the visual cost of this array and denoting it by $C_{old}$;

(9) exchanging two entries of the array M and computing the resulting visual cost $C_{new}$, and the change in visual cost, $\Delta\text{Cost} = C_{old} - C_{new}$;

(10) if $\Delta\text{Cost} > 0.0$, then accepting the change and making $C_{old} = C_{new}$;

(11) if $\Delta\text{Cost} > 0.0$, then computing statistic $\rho = \exp(-\Delta\text{Cost}/\tau)$ and a random number $\xi$, $0 < \xi < 1$, if $\rho < \xi$ then accepting the new configuration and making $C_{old} = C_{new}$, otherwise the array M remaining as it was;

(12) repeating steps 8–11 many times and then decreasing the test statistic $\tau$ by some factor k where k<1 to form a new test statistic $k\tau$; and

(13) repeating steps 8–12 many times until the visual cost no longer diminishes.

11. Halftoning apparatus comprising:

digital scanner means for generating from source material a digital signal representing density levels (gray levels) of pixels in the source material;

computer means programmed to operate upon the digital signal from the scanner to generate a set of correlated minimum visual modulation two-dimensional binary patterns, each pattern corresponding to one density level of the digital input signal, the set of patterns being generated simultaneously to minimize an ensemble cost function which is the variance of non-zero spatial frequencies weighted by a human visual system modulation transfer function; the computer further programmed to address modularly the patterns to select bits to from the halftone pattern; and marking engine means driven by the computer to create a halftone image.

12. The apparatus of claim 11 wherein the computer is programmed to generate the patterns by a combinatorial minimization technique.

13. The apparatus of claim 12 wherein the combinatorial minimization technique is stochastic annealing.

14. The apparatus of claim 12 wherein the combinatorial minimization technique is a genetic algorithm.

15. The apparatus of claim 11 wherein the marking engine is a laser printer.

16. The apparatus of claim 15 wherein the laser printer has a resolution in the range of 300 to 500 dots per inch.

17. A method for generating a halftone image in a computer comprising the steps of:

simultaneously generating a set of correlated two-dimensional binary patterns with each pattern corresponding to one density level of a digital input signal to minimize an ensemble cost function: and modularly addressing the patterns to select bits to form the halftone pattern.

18. A method for halftoning an image by modularly addressing an ensemble of two-dimensional binary patterns, each pattern corresponding to one density level of a digital image signal to select bits to form a halftone image, the ensemble of halftone patterns being correlated and having minimum visual modulation, the ensemble of patterns being generated simultaneously to minimize an ensemble cost function.

* * * * *